United States Patent [19]

Riederer

[11] Patent Number: 5,242,518
[45] Date of Patent: Sep. 7, 1993

[54] METHOD OF MECHANICALLY APPLYING A PROFILED ADHESIVE BEAD TO THE SURFACE OF A GLASS PANE

[75] Inventor: Rudolf Riederer, Pullheim, Fed. Rep. of Germany

[73] Assignee: Gurit-Essex AG, Freienbach, Switzerland

[21] Appl. No.: 730,632

[22] Filed: Jul. 16, 1991

[30] Foreign Application Priority Data

Jul. 17, 1990 [DE] Fed. Rep. of Germany ....... 4022484

[51] Int. Cl.⁵ .................. B29B 47/00; B32B 31/24
[52] U.S. Cl. .................. 156/107; 156/108; 156/109; 156/244.18; 156/244.19; 156/250; 156/256; 156/267; 83/53; 83/177
[58] Field of Search ............. 156/105, 106, 107, 108, 156/109, 244.18, 244.19, 250, 256, 267; 83/53, 177

[56] References Cited

U.S. PATENT DOCUMENTS

| 1,747,087 | 2/1930 | Schmalz | 83/177 |
| 2,963,821 | 12/1960 | Baker | 83/177 |
| 3,846,529 | 11/1974 | Poteet | 83/177 |
| 4,155,800 | 5/1979 | Wilson | 83/53 |
| 4,561,929 | 12/1985 | Lenhardt | 156/107 |
| 4,581,276 | 4/1986 | Kunert et al. | 156/108 |
| 4,769,105 | 9/1988 | Lisec | 156/107 |
| 5,108,526 | 4/1992 | Cornils et al. | 156/109 |
| 5,131,967 | 7/1992 | Tweadey et al. | 156/272.8 |

Primary Examiner—Caleb Weston
Attorney, Agent, or Firm—Tarolli, Sundheim & Covell

[57] ABSTRACT

A method for cutting a sticky plastically deformable material, placed on a surface of a glass pane by employing a jet-like cutting medium.

9 Claims, 2 Drawing Sheets

METHOD OF MECHANICALLY APPLYING A PROFILED ADHESIVE BEAD TO THE SURFACE OF A GLASS PANE

BACKGROUND OF THE INVENTION

The present invention refers, in a first aspect, to a method of cutting a sticky, plastically deformable material, particularly an adhesive bead, and in a second aspect, to a method of mechanically applying a profiled adhesive bead to the surface of a glass pane along the edge thereof, particularly to the surface of a vehicle pane, whereby the adhesive material is extruded through a profiled extruding nozzle. In this method, the extruding nozzle is led along the edge of the glass pane by means of a robot and the extruded adhesive bead is deposited along the edge of the glass pane.

It is well known in the art to mechanically apply a profiled adhesive bead along the edge of a glass pane by extruding the adhesive material through a profiled extruding nozzle which is led by a robot along the edge of the glass pane. Thereby, the profiled adhesive bead was always deformed, i.e. had not the desired cross-sectional shape, in the region of the start and of the end of the extruding operation because a profiled adhesive bead cannot be exactly cut due to its stickiness. Besides the fact that the appearance of such an adhesive bead is not very nice, the further problem exists that e.g. a vehicle glass pane to be adhesively bonded to a frame could be not waterproof in the region of said start and end region.

Thus, according to the prior art, one was forced to manually cut off the extruded profiled adhesive bead portion not having the desired shape at the start and the end region of the extruding operation, to manually remove the cut off portions from the surface of the pane and to manually insert there a portion of adhesive bead having the desired shape. Such proceeding was not only time-consuming and expensive but really was the bottleneck in the course of an automatic manufacture of prefabricated glass panes.

OBJECTS OF THE INVENTION

It is an object of the invention to provide a method of cutting a sticky, plastically deformable material, particularly an adhesive bead, which can be performed fully automatically without the need for any manual operation steps.

It is a further object of the invention to provide a method method of mechanically applying a profiled adhesive bead to the surface of a glass pane along the edge thereof, particularly to the surface of a vehicle pane, which can be performed fully automatically without the need for any manual operation steps.

SUMMARY OF THE INVENTION

To achieve these and other objects, the invention provides, according to a first aspect, a method of cutting a sticky, plastically deformable material, particularly an adhesive bead. According to the invention, the method comprises the step of cutting the material by means of a jet-like cutting medium.

Preferably, the jet-like cutting medium is a fluid jet, particularly a thin pencilled high pressure fluid jet, for example an air jet having a diameter of approximately 0.15 mm and a pressure of between 80 to 100 bar. According to another embodiment, the jet-like cutting medium can be a laser beam.

According to another aspect, the invention provides a method of mechanically applying a profiled adhesive bead to the surface of a glass pane along the edge thereof, particularly to the surface of a vehicle pane. In accordance with the invention, the adhesive material is extruded through a profiled extruding nozzle. First, the operation is started by leading the extruding nozzle along the edge of the glass pane by means of a robot and the extruded adhesive bead is deposited along the edge of the glass pane.

Simultaneously, that portion of the extruded adhesive bead which lies in the region of the start point of the extruding nozzle and which does not have the desired final shape from that portion of the extruded adhesive bead which has the desired final shape is mechanically cut off by means of a first cutting operation performed in a direction transverse to the extension of the adhesive bead.

Thereafter, the cut off portion of the adhesive bead which does not have the desired final shape is mechanically released and removed from the surface of the glass pane;

When the robot has finished its path along the edge of the glass pane, the extruding nozzle is taken off from the surface of the glass pane, i.e. as soon as it has reached the point where the portion of the extruded adhesive bead which lies in the region of the start point of the extruding nozzle and which does not have the desired final shape had been cut off from that portion of the extruded adhesive bead which has the desired final shape.

Then, the profiled adhesive bead extruded by said extruding nozzle is mechanically cut off to such a length that the two free ends of the adhesive bead congruently touch each other by means of a second cutting operation performed in a direction transverse to the extension of the adhesive bead and running parallel to the direction of the first cutting operation.

Finally, the end region of the adhesive bead is mechanically pressed to the surface of the glass pane and the two ends of the adhesive bead are mechanically pressed to the end of each other.

As the adhesive bead applied to the surface of the glass pane is sticky, the cutting operations are performed without mechanically touching the adhesive bead, e.g. by means of a pressurized jet-like cutting means, particularly pressurized air, a pressurized liquid or a laser beam. Also the operation of pressing the end region of the adhesive bead to the surface of the glass pane and pressing the two ends of the adhesive bead to the end of each other can be performed by means of a pressurized fluid medium like pressurized air or a pressurized liquid.

According to a preferred embodiment, said first and second cutting operations are performed in an oblique angle with reference to the surface of the glass pane such that the initial portion of the extruded adhesive bead which has the desired final shape from which a portion not having the desired shape has been cut off is overlapped by the end region of the adhesive bead.

BRIEF DESCRIPTION OF THE DRAWINGS

In the following, the methods of the invention will be further described, with reference to the accompanying drawings, in which.

DETAILED DESCRIPTION OF THE PREFERRED EMBODIMENT

Figure 1:
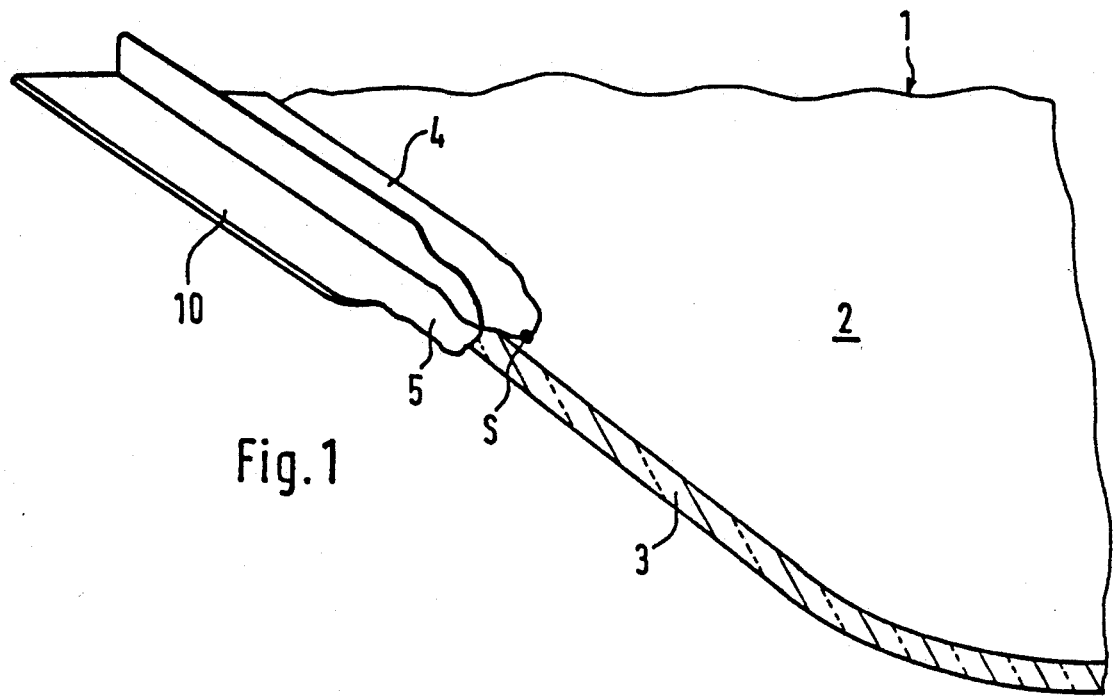
FIG. 1 shows a perspective partial view of a glass pane illustrating the initial part of the extruded profiled adhesive bead which does not have the desired shape.
Figure 2:
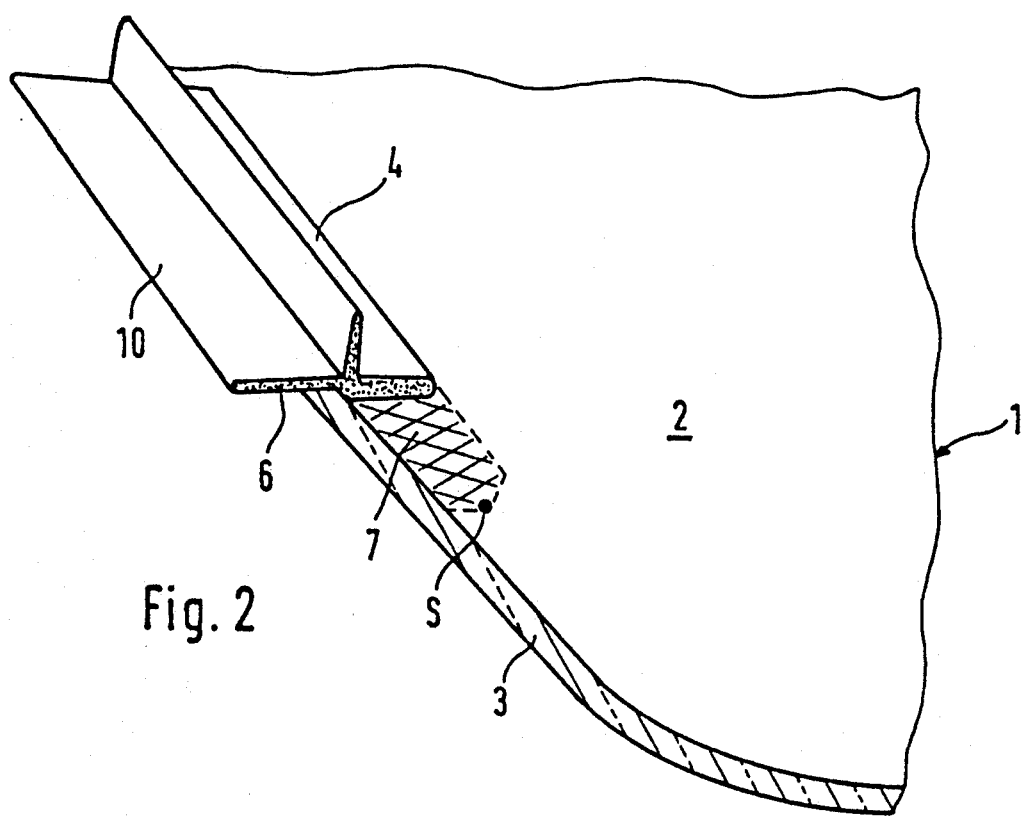
FIG. 2 shows a perspective partial view of a glass pane illustrating the initial part of the extruded profiled adhesive bead which has the desired shape, after cutting off and removing a first portion of the extruded profiled adhesive bead.
Figure 3:
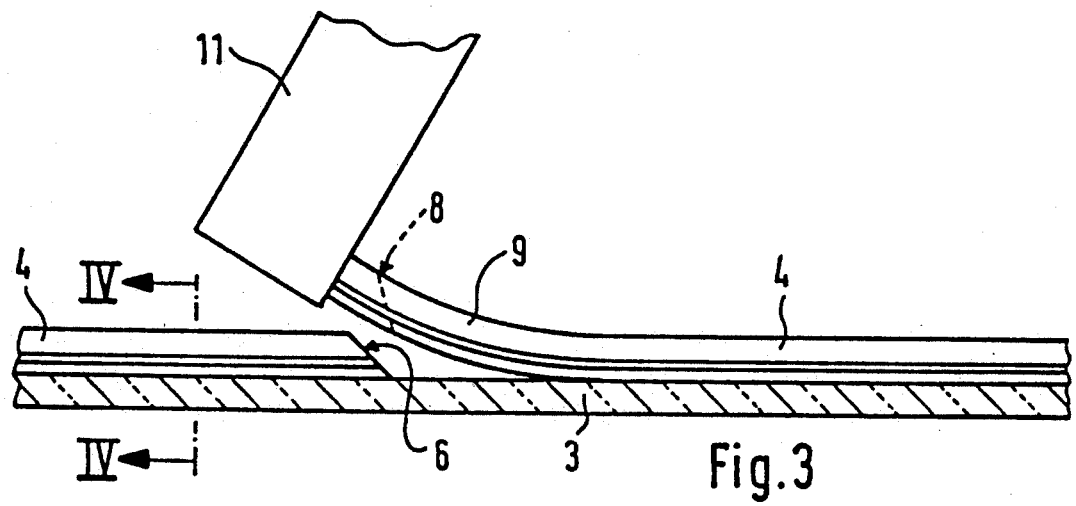
FIG. 3 shows a longitudinal cross sectional view of a part of the glass pane in a final phase of extruding the profiled adhesive bead.
Figure 4:
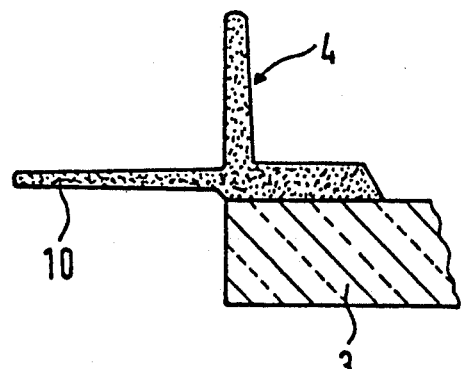
FIG. 4 shows a cross sectional view along the line IV—IV of FIG. 3 in a larger scale.

In all figures, the glass pane is designated by reference numeral 1, the glass pane surface is designated by reference numeral 2, the edge of the glass pane is designated by reference numeral 3 and the extruded profiled bead of adhesive material is designated by reference numeral 4. Preferably, the extruded profiled adhesive bead 4 has a cross section as shown in FIGS. 2 and 4, including a lip portion 10 extending over the edge 3 of the glass pane 1.

The depositing of the adhesive bead 4 on the surface 2 of the glass pane 1 is performed as follows:

First, the profiled extruding nozzle 11 is moved by means of a robot (not shown) to the starting point S (FIG. 2) on the surface 2 of the glass pane 1. Then, the extruding nozzle 11 is placed on the surface 2 of the glass pane 1 at the starting point S and, thereafter, via a dosing device (not shown), the adhesive material, e.g. a polyurethane adhesive, is extruded out of the nozzle 11 in a controlled manner while the nozzle 11 is moved along the edge 3 of the glass pane 1.

Thereby, an initial portion 5 of the adhesive bead 4 is generated in the region of the starting point S which portion doe not have the desired shape; that initial portion usually has a length of about 25 mm.

Now, during the further extrusion of the adhesive bead 4, the deformed portion 5 is cut off by means of a (not shown) cutting device which operates touchless in a direction transverse to the adhesive bead 4 and preferably in an oblique angle with reference to the surface 2 of the glass pane 1. As soon as that portion 5 is cut off, it is removed from the surface 2 of the glass pane 1. The result is that the adhesive bead 4, at its starting end, is not deformed anymore, but begins with the exact desired cross sectional shape 6 as can be seen from FIG. 2.

As cutting device, preferably a pencilled jet having a diameter of approximately 0.15 mm of a pressurized fluid, e.g. pressurized air, is used with a pressure of 8 to 10 MPa (80–100 bar). If a pressurized fluid is used as a cutting device, the cutting device can be reset to the starting point S after termination of the cutting operation and the cut off initial portion 5 of the adhesive bead 4 can be blown off from the surface 2 of the glass pane 1. It is possible that minor traces 7 of the blown off portion 5 of the adhesive bead remain on the surface 2 of the glass pane 1 (cf. FIG. 2), but these traces 7 do not impair the later pressing on of the final end 9 of the adhesive bead 4 onto the surface 2 of the glass pane 1.

During this operation, i.e. during cutting off the deformed portion 5 and during blowing off the deformed portion from the surface 2 of the glass pane 1, the extrusion of the adhesive bead along the edge 3 of the glass pane 1 is continued. Shortly before the extruding nozzle 11 reaches the starting point S again, i.e. shortly before reaching the final point of the extruding operation, the extruding nozzle 11 and, thereby, the final portion 9 of the extruded adhesive bead is lift off from the surface 2 of the glass pane 1.

Now, by means of the aforementioned cutting device, the end portion 9 of the profiled adhesive bead 4 extruded by said extruding nozzle 11 is mechanically cut off to such a length that the two free ends of the adhesive bead 4 congruently touch each other by means of a second cut 8 performed in a direction transverse to the extension of the adhesive bead 4 and running parallel to the direction of the first cut 6. The result is that the lifted end portion 9 of the adhesive bead 4 falls back to the surface 2 of the glass pane 1 under the influence of gravity.

It is desired that the two ends 6 and 8 of the extruded adhesive bead 4 lie as closely together as possible in their final position on the surface 2 of the glass pane 1. If the aforementioned first and second cutting operations are performed in an oblique angle with reference to the surface of the glass pane, the said initial portion 6 of the extruded adhesive bead 4 which has the desired final shape from which a portion 5 not having the desired shape has been cut off is overlapped by the end region 9 of the adhesive bead 4. Thus, an uninterrupted adhesive bead 4 can be realized on the surface 2 of the glass pane 1.

Finally, the end region 9 of the adhesive bead 4 which loosely lies on the surface 2 of the glass pane 1 is pressed from above to the surface 2 of the glass pane 1 and, simultaneously, the two ends 5 and 8 of the adhesive bead 4 are pressed against each other. Preferably, this pressing operation is also touchlessly performed, e.g. by means of a soft air jet. The two ends of the lip 10 protruding over the edge 3 of the glass pane 1 are pressed together from above and from below, preferably also touchless, e.g. also by means of a air jet.

What is claimed is:

1. A method of mechanically applying a profiled adhesive bead to the surface of a glass pane along the edge thereof, the method comprising the steps of:

extruding an adhesive bead through a profiled extruding nozzle;

starting the operation of leading said extruding nozzle along the edge of said glass pane by means of a robot and depositing the extruded adhesive bead along the edge of said glass pane;

simultaneously mechanically cutting off that portion of the extruded adhesive bead which lies in the region of the start point of said extruding nozzle and which does not have the desired final shape from that portion of the extruded adhesive bead which has the desired final shape by means of a first cutting operation performed in a direction transverse to the extension of the adhesive bead;

mechanically releasing and removing said cut off portion of the adhesive bead which does not have the desired final shape from the surface of said glass pane;

taking off said extruding nozzle from the surface of said glass pane as soon as it has reached the point where said portion of the extruded adhesive bead which lies in the region of the start point of said extruding nozzle and which does not have the desired final shape had been cut off from that portion of the extruded adhesive bead which has the desired final shape;

mechanically cutting off the profiled adhesive band extruded by said extruding nozzle to such a length that two free ends of the adhesive bead are formed which ends congruently touch each other by means of a second cutting operation preformed in a direction transverse to the extension of the adhesive bead and running parallel to the direction of said first cutting operation; and mechanically pressing the end region of the adhesive bead to the surface of said glass pane and mechanically pressing the two ends of the adhesive bead to the end of each other.

2. The method according to claim 1 in which said steps of releasing and removing said cut off portion of the adhesive bead which does not have the desired final shape from the surface of said glass pane are performed by means of a pressurized fluid medium.

3. The method according to claim 2 in which said pressurized fluid medium is pressurized air.

4. The method according to claim 1 in which said steps of pressing the end region of said adhesive bead to the surface of said glass pane and pressing the two ends of said adhesive bead to the end of each other are performed by means of a pressurized fluid medium.

5. The method according to claim 4 in which said pressurized fluid medium is pressurized air.

6. The method according to claim 1 in which said first and second cutting operations are performed in an oblique angle with reference to the surface of said glass pane such that said initial portion of the extruded adhesive bead which has the desired final shape from which a portion not having the desired shape has been cut off is overlapped by said end region of said adhesive bead.

7. The method according to claim 1 in which the cutting operations are preformed by means of a jet of pressurized fluid medium.

8. The method according to claim 7 in which said pressurized fluid medium is pressurized air.

9. The method of claim 1 in which said glass pane is a vehicle pane.

* * * * *